United States Patent [19]
Jaster et al.

[11] Patent Number: 5,413,848
[45] Date of Patent: May 9, 1995

[54] INSULATING FOAM OF LOW THERMAL CONDUCTIVITY AND METHOD OF PREPARATION

[75] Inventors: Heinz Jaster; William J. Ward, III, both of Schenectady, N.Y.

[73] Assignee: General Electric Company, Schenectady, N.Y.

[21] Appl. No.: 283,433

[22] Filed: Aug. 1, 1994

Related U.S. Application Data

[62] Division of Ser. No. 172,005, Dec. 22, 1993.

[51] Int. Cl.$^6$ ................................................. B32B 3/26
[52] U.S. Cl. ............................... 428/305.5; 428/314.4; 428/319.7; 428/322.7; 521/53; 521/92; 521/97; 521/123; 521/130; 521/155; 521/918
[58] Field of Search ............ 428/305.5, 314.4, 319.7, 428/322.7; 521/92, 97, 123, 130, 155, 53, 918

[56] References Cited

U.S. PATENT DOCUMENTS

| | | | |
|---|---|---|---|
| 4,110,268 | 8/1978 | Tongley | 521/125 |
| 4,176,218 | 11/1979 | Demon et al. | 521/125 |
| 4,469,820 | 9/1984 | Dexheimer et al. | 521/125 |
| 4,686,240 | 8/1987 | Bailey, Jr. et al. | 521/125 |
| 4,999,383 | 3/1991 | Blount | 521/125 |
| 5,110,834 | 5/1992 | Hom | 521/125 |
| 5,286,429 | 2/1994 | Blythe et al. | 521/79 |
| 5,302,624 | 4/1994 | Reedy et al. | 521/79 |

*Primary Examiner*—Morton Foelak
*Attorney, Agent, or Firm*—William H. Pittman

[57] ABSTRACT

Low thermal conductivity insulation for refrigerators and the like is produced by blowing a resinous foam in an inert (e.g., nitrogen) atmosphere with a mixture of carbon dioxide and a low thermal conductivity inert gas such as krypton or xenon. The foam is then sealed in a gas-impervious enclosure and carbon dioxide is removed therefrom, typically by inclusion in said enclosure of a solid material reacted therewith such as an alkaline reagent. The final partial pressure of the low thermal conductivity gas in the enclosure is in the range of about 20–200 torr, and the total pressure is up to 110% of said partial pressure.

11 Claims, No Drawings

INSULATING FOAM OF LOW THERMAL CONDUCTIVITY AND METHOD OF PREPARATION

This application is a division, of application Ser. No. 08/172,005, filed Dec. 22, 1993.

BACKGROUND OF THE INVENTION

This invention relates to insulating foams, and more particularly to foams having unusually low thermal conductivity.

Insulating foam, particularly polyurethane foam, is an indispensable constituent of many refrigerators and similar cooling units. By reason of increasingly strict Federal Government energy conservation standards, it is of interest to develop foams having substantially lower thermal conductivity than those presently available.

Conventional insulating polyurethane foam is generally prepared by the reaction of at least one polyol with at least one diisocyanate in the presence of suitable catalysts, surfactants and blowing agents. Among the blowing agents employed are halogenated compounds, which may be halocarbons such as monofluorotrichloromethane and/or halohydrocarbons such as 1,1-dichloro-1-fluoroethane. They remain in the cell voids of the foam after blowing, and their presence therein is beneficial since they have low thermal conductivity and thus contribute to the insulating quality of the foam.

Also usually present in the reaction mixture is water, which serves at least three purposes. First, in small quantities it is effective to improve the flow properties of the mixture. Second, it reacts with a minor proportion of the diisocyanate to form carbon dioxide, which is also effective as a blowing agent. Third, it reacts to form substituted urea crosslinking moieties, thus stabilizing the foam as it is produced.

The use of many halocarbons is now severely restricted and will soon be prohibited by reason of their property of depleting the stratospheric ozone layer. Halohydrocarbons are an interim solution but their use will ultimately also be prohibited. It is therefore necessary to develop methods for blowing insulating foam which do not require the use of halogen-containing blowing agents. At the same time, however, a high degree of insulating power is more necessary than ever to decrease energy consumption. An additional desirable factor is suppression of the "greenhouse effect" which promotes global warming.

Carbon dioxide has a high thermal conductivity, on the order of 17 milliwatts/m-°K. Thus, a foam prepared with the use of a blowing agent combination including 15% and 50% (by volume) carbon dioxide with the balance being monofluorotrichloromethane has a thermal conductivity approximately 5% and 15%, respectively, higher than a corresponding foam prepared without the use of carbon dioxide.

It would thus be of considerable interest to devise methods for producing insulating foam which employ carbon dioxide as a blowing agent, but which also produce a foam free from carbon dioxide or containing only very minor proportions thereof. It would further be of interest to incorporate in the foam cells a gas of very low thermal conductivity, reducing the conductivity of the foam itself to a value roughly equal to that obtained by the use of monofluorotrichloromethane as a blowing agent.

It is known to incorporate gases of low thermal conductivity, particularly noble gases such as krypton, in insulating panels at atmospheric pressure. However, krypton is very expensive; its use in foam at atmospheric pressure adds about one dollar per board foot to the cost of the insulation. Xenon, another noble gas with potential for such use, is even more expensive, adding $4.50 per board foot at atmospheric pressure. Therefore, the production of foams of this type has been economically unfeasible.

The present invention provides an economically feasible method for producing plastic foams blown with carbon dioxide in combination with an inert gas, and subsequently removing said carbon dioxide to produce an insulating foam which is very low in thermal conductivity and which is in other respects environmentally beneficial or neutral. Said method is adapted to in situ production of carbon dioxide in conventional equipment used for the production of polyurethane foam and the like. Also provided are resinous foams of unusually low thermal conductivity.

DESCRIPTION OF THE PRIOR ART

Insulating panels containing such gases as krypton at atmospheric pressure are disclosed, for example, in Griffith et al., *Gas-Filled Panel High-Performance Thermal Insulation*, Lawrence Berkeley Laboratory (1991). Copending, commonly owned application Ser. No. 08/37,841 describes the use of a blowing agent for polyurethane insulating foam comprising, in part, carbon dioxide, followed by removal of the carbon dioxide, followed by removal of said carbon dioxide by reaction with a solid reagent such as an alkaline reagent which is incorporated in the foam.

SUMMARY OF THE INVENTION

In one of its aspects, the invention is an insulating material comprising a resinous foam having cells filled with an inert gas having a thermal conductivity up to 10 milliwatts/m-°K., said foam being sealed in a gas-impervious enclosure at a partial pressure of said inert gas in the range of about 20–200 torr and a total pressure no greater than 110% of said partial pressure.

Another aspect of the invention is a method for producing an insulating foam which comprises:

blowing a resinous foam in an otherwise inert atmosphere with a gaseous mixture comprising carbon dioxide and at least one inert gas having a thermal conductivity up to 10 milliwatts/m-°K.;

sealing said foam in a gas-impervious enclosure; and removing the remaining carbon dioxide from said sealed foam;

the proportions of gases employed during foam production being such that the partial pressure of said low thermal conductivity gas in said enclosure is in the range of about 20–200 torr and the total pressure therein is up to 110% of said partial pressure.

DETAILED DESCRIPTION; PREFERRED EMBODIMENTS

Any resinous material capable of being converted to a stable foam may be employed in the invention. Illustrative resinous materials are thermoplastics such as polyphenylene ether, polystyrene and combinations thereof, and thermoset resins such as polyurethanes. Polyurethanes are generally preferred by reason of their relatively low cost, high dimensional stability and general suitability. Because of these advantages, reference will frequently be made hereinafter to polyurethane foam. However, it should be understood that other foamed resinous materials, both thermoplastic and thermosetting, may be substituted for polyurethane when appropriate and may be produced for use in the invention by methods which will be apparent to those skilled in the art.

The polyurethane-forming reagents which may be employed according to the present invention are conventional and well known in the art, and therefore do not require extended discussion herein. In general, said reagents include at least one polyol, typically a poly(oxyalkylene) polyol, and at least one diisocyanate such as toluene diisocyanate, employed in proportions effective to produce the desired polyurethane as a reaction product. Also typically present are catalysts such as amines and organotin compounds, as illustrated by dimethylcyclohexylamine and dibutyltin dilaurate; and surfactants, typically silicone compounds.

An essential feature of the invention is the employment of carbon dioxide as the principal blowing agent. In the case of polyurethane foams, carbon dioxide is typically produced in situ by the reaction of diisocyanate with added water. If the amount of water is insufficient to produce the required amount of carbon dioxide, additional carbon dioxide may be added in gaseous form.

It is highly preferred to maintain the foam-producing reagents under conditions that will preserve in the final hermetic enclosure therefor (as defined hereinafter) an inert atmosphere. The term "inert" as used herein defines an environment which is non-reactive with the foam and with materials in contact therewith, including said hermetic enclosure. Suitable atmospheres comprise nitrogen, helium or argon. Nitrogen is generally preferred by reason of its low cost. Suitable conditions may be maintained by contacting the liquid foam-producing reagents in said inert environment at a pressure up to about one atmosphere for an effective period prior to foam production.

The blowing agent for the foam is a combination of carbon dioxide with at least one inert material having a thermal conductivity up to 10 milliwatts/m-°K., which will remain in the cells. For obvious reasons, it is necessary that the low thermal conductivity inert material be a gas or vapor at ambient temperature.

Among the gases suitable for this purpose are various fluorohydrocarbons and at least two noble gases, krypton and xenon. These noble gases are characterized by particularly low thermal conductivity and are therefore preferred. Krypton is especially preferred because of its relatively low cost in comparison with xenon.

The inert gas is employed in an amount to provide a partial pressure in the foam in the range of about 20–200 and preferably about 50–200 torr. Most preferably, said partial pressure is about 75–80 torr if the low thermal conductivity gas is krypton; if it is xenon, a partial pressure as low as 20–25 torr may be employed to minimize cost. Thus, upon removal of the carbon dioxide without replacement thereof, substantially the entire gaseous pressure within the hermetic foam enclosure will be attributable to said inert gas. Typically, said gas is incorporated in the polyurethane-forming reagents at the mixing head therefor, as described hereinafter. In the case of other resinous materials, it may be combined at the desired partial pressure with the carbon dioxide employed as the principal blowing agent.

Following the foaming operation which incorporates the inert gas, the foam is hermetically sealed in a suitable enclosure which will substantially exclude air, prevent loss of inert gas and serve as a barrier to passage of water vapor. If the foam is to be employed to insulate a refrigerator, freezer or the like, the enclosure may be of welded metal. More often, however, it is of a polymeric barrier material.

Suitable barrier materials are known in the art and include, for example, polyvinyl alcohol and ethylenevinyl alcohol copolymers. In general, a multilayer polymeric material is preferred in which another layer comprises a structurally stable polymer such as a polyester. If a high proportion of water vapor is anticipated in the environment of the insulation (e.g., a relative humidity equal to or greater than about 50%), a water-resistant layer such as poly(vinylidene fluoride) may be incorporated. In order to facilitate sealing of the enclosure, a heat-sealable layer, typically of an olefin polymer such as polyethylene, may also be present. A suitable multilayer barrier polymeric material is sold by Fres-Co System USA, Inc., under the trade name VECAT.

It is necessary, after sealing the foam, to remove carbon dioxide since its thermal conductivity is very high relative to the inert gas. It may conveniently be removed by incorporating in the foam enclosure at least one solid reagent capable of carbon dioxide removal, in a manner similar to that disclosed in the aforementioned application Ser. No. 08/037,841 which is incorporated herein by reference.

Said reagent is sometimes hereinafter designated "carbon dioxide-reactive reagent". However, it should be understood that it is not necessary that it react chemically with the carbon dioxide; it may also remove it by adsorption or a similar phenomenon. It is preferably added as a finely divided powder, although larger particles such as granules (maximum particle size up to about 2 mm.) may also be effective.

Over a period of time, the carbon dioxide-reactive reagent removes the carbon dioxide in the cell voids of the foam. Times required for removal may be as great as 1–2 months.

Suitable carbon dioxide-reactive reagents include molecular sieves and alkaline reagents. Alkaline reagents are often preferred. They include alkali metal and alkaline earth metal oxides and hydroxides, as exemplified by lithium hydroxide, sodium hydroxide, calcium oxide and hydroxide and barium oxide and hydroxide. Mixtures of these reagents may also be employed. An example is soda lime which is a mixture of calcium oxide with about 5–20% sodium hydroxide, said mixture generally also containing about 6–18% water.

It is sometimes found that certain carbon dioxide-reactive reagents, particularly lithium hydroxide and molecular sieves, become inactivated prior to or during polyurethane formation. In the case of molecular sieves, it is believed that this is a result of occlusion by one or more other foam-forming reagents. In the case of lithium hydroxide, it may be caused by similar occlusion or by blocking of the pores of the lithium hydroxide particles by lithium carbonate initially formed. Inactivation may be avoided by encapsulating the carbon dioxide-reactive reagent in a substantially inert encapsulating agent which is permeable to carbon dioxide. Suitable encapsulating agents, typically polymers, will be apparent to those skilled in the art. The preferred carbon dioxide-reactive reagent is powdered sodium hydroxide, since it is particularly effective in the absence of encapsulation.

The amount of carbon dioxide-reactive reagent employed is an amount effective to remove a substantial proportion of the carbon dioxide in the foam within the aforementioned period of about 1-2 months after foaming. The amount adequate for this purpose will vary according to the reagent employed, its particle size and other conditions, but can easily be determined by simple experimentation. When an alkaline reagent is employed, the molar ratio thereof to theoretical carbon dioxide should be in the range of about 1-3:1.

For the purposes of the invention, it is also critical that the proportions of the various gases present during foam production be such that the total pressure of the enclosed system be no greater than about 110% of the partial pressure of the low thermal conductivity gas. Preferably, the total pressure is no greater than about 102% of said partial pressure.

In a typical foam-producing operation according to the present invention, diisocyanate is one reactive stream while polyol, catalysts, surfactants and water form the other. The two streams may be mixed in a conventional foam-producing nozzle into which the inert gas is injected. The nozzle also typically contains a gas feed port for introduction of low thermal conductivity inert gas. The liquid reagents are exposed to nitrogen prior to foam production, as described hereinabove.

Carbon dioxide-reactive reagent may be introduced in the form of a viscous slurry in a suitable nonreactive liquid such as a relatively high molecular weight amine. If the amount thereof which is necessary is high in view of the large amount of carbon dioxide generated as the sole blowing agent, it may be advisable to incorporate said reagent in a carrier unit separate from the foam-producing reagents; for example, it may be embedded in a film of olefin polymer such as polyethylene. If water is produced by reaction of said reagent with the carbon dioxide, incorporation of a drying agent such as calcium chloride may also be necessary.

What is claimed is:

1. An insulating material comprising a resinous foam having cells filled with an inert gas having a thermal conductivity up to 10 milliwatts/m-°K., said foam being sealed in a gas-impervious enclosure at a partial pressure of said inert gas in the range of about 20-200 torr and a total pressure no greater than 110% of said partial pressure, said enclosure also containing a reaction product of carbon dioxide with at least one solid reagent capable of reacting with carbon dioxide under ambient conditions.

2. A material according to claim 1 wherein the foam is a thermoset foam.

3. An article according to claim 2 wherein the foam is a polyurethane foam.

4. An article according to claim 1 wherein the inert gas is krypton.

5. An article according to claim 4 wherein the krypton partial pressure is about 75-80 torr.

6. An article according to claim 4 wherein the enclosure is of welded metal.

7. An article according to claim 4 wherein the enclosure is of a polymeric barrier material.

8. An article according to claim 7 wherein the barrier material comprises polyvinyl alcohol.

9. An article according to claim 8 wherein the barrier material also comprises poly(vinylidene fluoride).

10. An article according to claim 4 wherein the foam is a polyurethane foam.

11. An article according to claim 10 wherein the total pressure is no greater than about 102% of said partial pressure.

* * * * *